(No Model.)

J. JOHNSTON.
COVER FOR COOKING UTENSILS.

No. 526,712.  Patented Oct. 2, 1894.

WITNESSES:

INVENTOR:
John Johnston

UNITED STATES PATENT OFFICE.

JOHN JOHNSTON, OF PHILADELPHIA, PENNSYLVANIA.

COVER FOR COOKING UTENSILS.

SPECIFICATION forming part of Letters Patent No. 526,712, dated October 2, 1894.

Application filed July 18, 1894. Serial No. 517,856. (No model.)

*To all whom it may concern:*

Be it known that I, JOHN JOHNSTON, of the city and county of Philadelphia and State of Pennsylvania, have invented an Improvement in Covers for Cooking Utensils, of which the following is a specification.

My invention relates to covers for cooking utensils and consists of certain improvements which are fully set forth in the following specification and are shown in the accompanying drawings.

In the cooking of many articles of food, particularly vegetables, such as cabbage, cauliflower, turnips, &c., more or less offensive odor arises from the vessel, which permeates to some extent the atmosphere of the entire house. This offensive odor is largely due to confinement within the vessel of gaseous vapors which are given off by the vegetables during the process of cooking; and which, when confined are subject to chemical reaction or change which affects the food; and as it becomes affected the disagreeable odor is emitted from it.

An uncovered vessel for hygienic reasons would be preferable to a covered one for cooking vegetables in, but even in it watery vapor lingers over the top and changes occur which affect the food within it; but to a less extent than if a close cover were upon it. It is always desirable however, that the vessel should be covered to prevent insects and other objects from falling into the food.

The object of my invention is to obviate these difficulties by means of a cover of peculiar construction, which while sufficiently covering the vessel to prevent foreign substances from falling into the food affords free escape for the gases or vapors that are generated during the cooking, and also operated to draw and expel them from the vessel as fast as they are generated so that the objectionable chemical reaction cannot take place.

I shall now refer to the accompanying drawings for the purpose of more particularly describing my improvements.

Figure 1:
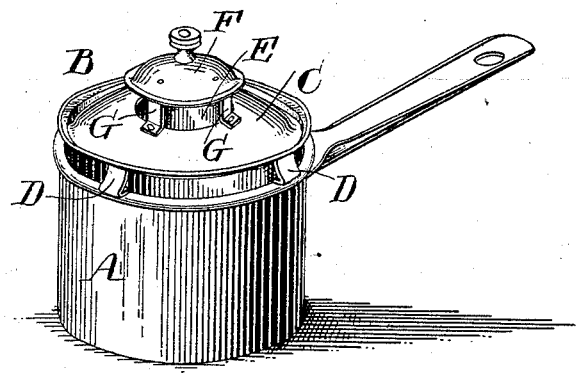
Figure 2:
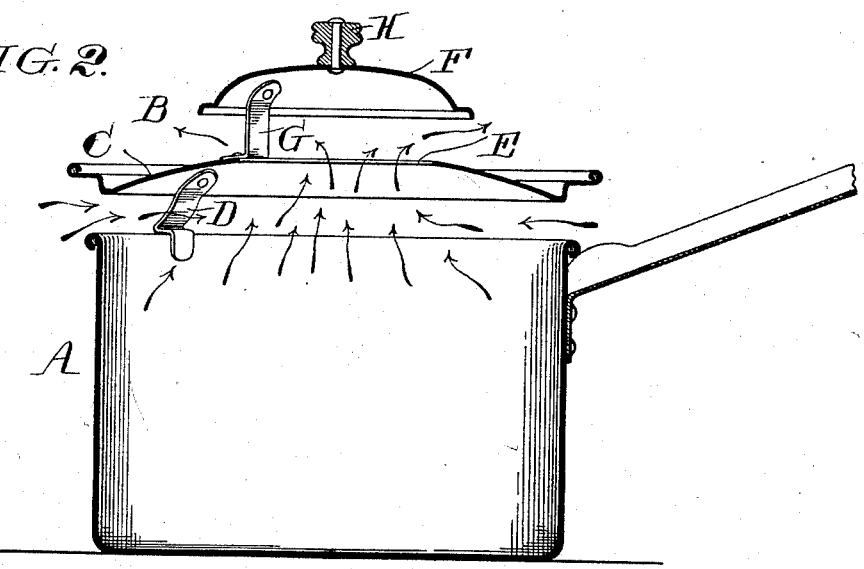

Figure 1 is a perspective view of a saucepan provided with my improved cover; and Fig. 2 is a vertical sectional view of the same on an enlarged scale.

A is a saucepan or other cooking vessel.

B is the cover. As shown, this cover consists of a plate C provided with supporting feet or pieces D adapted to rest upon the rim of the vessel A, and having a cover or less centrally disposed opening E, and a cover or hood F, located over the opening E.

The plate C is so supported upon the vessel A as to be elevated slightly above it leaving a space between the plate and the rim of the vessel.

The hood or cover F is similarly supported at a slight elevation above the plate C, as by the supporting feet or pieces G, so as to leave an open space between the hood and the plate C above the opening E.

The hood or cover F may be provided with a handle or knob H of wood or other suitable material by means of which the cover as an entirety may be lifted. If desired the hood or cover F may be omitted.

Through the space of annular opening between the plate C and the rim of the vessel air is drawn as indicated by arrows in Fig. 2 and the air thus passing over the top of the vessel mixes with the rising gases and prevents the objectionable reactions referred to. The air also draws upward the gases and vapors from the top of the food within the sauce pan and together with the vapors and gases thus drawn up passes out through the opening E and escapes into the atmosphere. The gaseous vapors which are liberated will be lifted from the surface of the cooking food and will be carried off as fast as they are generated so that the formation of noxious odors will be avoided and the true flavor of the food will be preserved.

The minor details of construction shown may be varied without departing from the invention.

What I claim as new, and desire to secure by Letters Patent, is—

1. A cover for a cooking vessel consisting of a plate adapted to be supported upon the vessel with more or less extended openings between its edge and the rim of the vessel for the admission of air and provided with an aperture in its face for the escape of said air and the gaseous vapors generated by the cooking of the food in the vessel.

2. A cover for a cooking vessel consisting of a plate adapted to be supported upon the vessel with more or less extended openings between its edge and the rim of the vessel for the admission of air currents and provided with an aperture in its face for the escape of said air currents and the gases and vapors generated by the cooking of the food in the vessel, and an elevated hood or cover over the aperture in the face of the plate.

In testimony of which invention I have hereunto set my hand.

JOHN JOHNSTON.

Witnesses:
ERNEST HOWARD HUNTER,
HELEN L. MOTHERWELL.